(12) United States Patent
Laserson et al.

(10) Patent No.: US 11,763,192 B2
(45) Date of Patent: Sep. 19, 2023

(54) TRANSACTION EXCEPTION AND FRAUD PROCESSING

(71) Applicant: NCR Corporation, Atlanta, GA (US)

(72) Inventors: Itamar David Laserson, Givat Shmuel (IL); Avishay Farbstein, Bruchin (IL); Loran Halfon, Ramat Gan (IL); Tali Shpigel, Bnei brak (IL)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/555,811

(22) Filed: Aug. 29, 2019

(65) Prior Publication Data

US 2021/0065190 A1    Mar. 4, 2021

(51) Int. Cl.
*G06N 20/00*    (2019.01)
*G06Q 20/40*    (2012.01)

(52) U.S. Cl.
CPC ......... *G06N 20/00* (2019.01); *G06Q 20/4016* (2013.01)

(58) Field of Classification Search
None
See application file for complete search history.

(56) References Cited

U.S. PATENT DOCUMENTS

| 10,430,845 B2 * | 10/2019 | Koretz | ............... G06Q 30/0603 |
| 2009/0063240 A1 * | 3/2009 | Pallari | .................... G06Q 10/06 705/7.15 |

* cited by examiner

*Primary Examiner* — Namrata Boveja
*Assistant Examiner* — Amit Patel
(74) *Attorney, Agent, or Firm* — Schwegman Lundberg & Woessner, P.A.

(57) ABSTRACT

A machine-learning algorithm is trained with features relevant to transaction exceptions, distributions of items in transaction mapped to product hierarchies, and operator data. The trained algorithm is trained to predict whether a given transaction requires a transaction exception for potential fraud or for management approval. The trained algorithm is then provided a set of in-progress input data for an in-progress transaction being processed on a transaction terminal. Output from the trained algorithm is used to determine whether the in-progress transaction is allowed to continue processing unabated or whether the in-progress transaction is to be suspended with a transaction exception requiring a manager override or security credential to continue processing.

18 Claims, 4 Drawing Sheets

TRANSACTION EXCEPTION AND FRAUD PROCESSING

BACKGROUND

It is estimated that a 2-tier retailer spends approximately 1.7 million hours a year on manager approvals for a variety of transaction-based situations. This translates into over $17 million in associated labor costs and does not account for consumer frustration associated with delays in transaction throughput.

Manager approvals are triggered based on predefined situations defined by a retailer developed from retailer-experienced problems with transactions and embodied in retailer-defined business rules. Some research indicates that over 95% of transaction interruptions that require manager intervention are unjustified and are simply a waste of time and resources. Transaction approvals are prompted by software that evaluates transaction conditions in view of the retailer-defined business rules. The terminals that process the transaction interrupt the transactions and require manager overrides when the business rules dictate for such things as: price overrides, transaction voids, returns over a certain price threshold, and other activities identified by a retailer as potential cashier fraud activity.

When a transaction interruption is triggered, the terminal prompts the terminal operator to enter manager credentials possessed and known by a manager of the retailer. The operator (cashier) then waits for a manager to be dispatched to the terminal and enter the credentials (in which case the action that precipitated the interruption is successfully processed on the terminal) or the cashier cancels the action that required manager intervention (in which case the action does not complete successfully). In either case, the manager's approval that was requested and the result of the interruption are recorded in a transaction log for the terminal.

This procedure wastes cashier time, manager time, and customer time while waiting for the transaction to conclude. Other customers are also stuck in lines and become dissatisfied with the retailer's level of customer service. More importantly, over 95% of the time the transaction interruption is unjustified and not needed and the interruption is ineffective in achieving its primary goal of preventing cashier fraud and/or cashier mistakes. Furthermore, retailer-defined business rules are preconfigured to trigger the interruptions when predefined thresholds are reached. These thresholds are constants, which means they become easier to learn by fraudster cashiers that study transaction behaviors for the purpose of committing fraud against the retailer. The nefarious cashiers simply operate around the predefined thresholds, such that the interruptions are never triggered since the thresholds are never reached.

SUMMARY

In various embodiments, methods and a system for transaction exception and fraud processing are presented.

According to an embodiment, a method for transaction exception and fraud processing is presented. Specifically, and in one aspect, an event is received for an in-progress transaction and the event is classified as a classified event. Transaction data and operator data associated with the in-progress transaction are obtained. A decision is made based on the classified event, the transaction data, and the operator data as to whether to raise a transaction exception for the in-progress transaction. When the decision is to raise the transaction exception, the decision is communicated to a transaction terminal that is processing the in-progress transaction.

DETAILED DESCRIPTION

Figure 1:
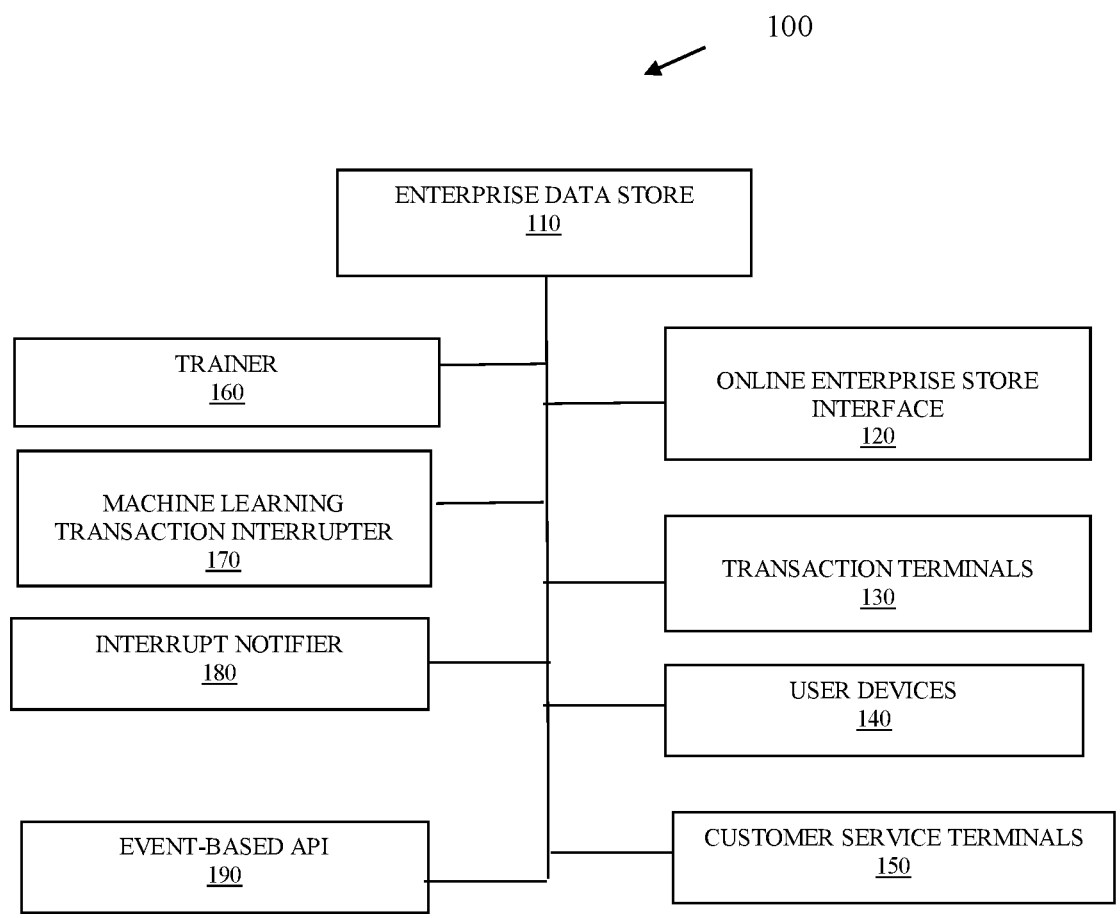
FIG. 1 is a diagram of a system for transaction exception and fraud processing, according to an example embodiment.

FIG. 1 is a diagram of a system 100 for transaction exception and fraud processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of transaction exception and fraud detection presented herein and below.

The system 100 provides a mechanism by which a machine-learning algorithm can be trained with transaction item information (basket data), transaction event information, and cashier history information for purposes of predicting whether a transaction event during a transaction necessitates a transaction interruption for management intervention.

The system 100 includes, an enterprise data store 110, an online enterprise store interface 120, a plurality of transaction terminals 130, user devices 140, a plurality of customer service terminals 150, a machine-learning trainer 160, a machine-learning transaction interrupter (herein after just "interrupter") 170, an interrupt notifier 180, and an event-based Application Programming Interface (API) 190.

The trainer 160, the interrupter 170, the interrupt notifier 180, and the event-based API 190 are executable instructions that reside in a non-transitory computer-readable storage medium. The executable instructions are executed by one or more hardware processors of computing devices. This causes the processor(s) to perform the processing discussed herein and below for 160-190.

The online enterprise store interface 120, the transaction terminals 130, user devices 140, and customer service terminals 150 comprise a plurality of hardware devices that execute software as services provided throughout the enterprise over one or more networks (wired, wireless, and/or a combination of wired and wireless).

The enterprise data store 110 captures data gathered throughout the enterprise by the services. One type of data housed in the data store 110 includes transaction data for transactions conducted on the transaction terminals. The transaction data includes sale price, item detail, transaction date, transaction time of day, transaction day of week, store identifiers for stores associated with each transaction, transaction terminal identifiers, and the like. The data store 110 also includes item inventory, item description, item store location, item shelf location within the store, product categories, product catalogue, etc. Further, the data store 110 may also include a variety of other data such as customer item returns, customer visits to service terminals 150, customer visits to online stores of the enterprise, customer visits to brick-and-mortar stores of the enterprise, customer account details, holiday dates, weather in a particular location on a particular date, sporting event on a given date, any catastrophic newsworthy events observed for a given date. Still further the enterprise data store 110 includes cashier historical data, such as a total number of past justified management approvals processed on terminals 130 and a total number of past unjustified transaction interruptions for which management approvals were unnecessary for any give cashier.

As used herein a "transaction interruption" is intended to mean an incident or an event for which a transaction is held in abeyance for a management approval or override before such transaction can continue.

A management approval incident is considered "justified" when a manager did not approve a given action, such that the action is prevented from being processed on a given terminal 130. Any other management approval incident that was not justified is considered to be unjustified.

As stated before, conventionally over 95% of management approval incidents in the industry are unjustified. This is changed with the teachings presented herein and below. Additionally, the conventional business-rules associated with transaction interruptions (management approvals) are replaced and not used with the teachings presented herein, which means that there are no discernable threshold or rules that a cashier can discover to know when a transaction interruption will or will not occur at a terminal 130.

Initially, transaction logs of a retailer are processed to assign all transaction interruptions a value of "0" (indicating that management approval was deemed necessary and obtained with a corresponding action processed) or a value of "1" (indicating management approval was unnecessary and the corresponding action was not processed). The values of 0 (action needed to be processed) and 1 (action did not process) are tagged within the retailer's transaction logs for the corresponding transactions.

The tagged transaction logs are then provided as input by the trainer 160 to train the interrupter 170. The interrupter 170 fine tunes itself to predict incidents where manager approval is required. In other words, the interrupter 170 configures its underling machine-learning algorithm for classifying new POS events, some of which may not have even previously triggered transaction interruptions. If the model developed by the interrupter 170 estimates that prompting for manager approval will result in preventing the action, then the incident (transaction event) is classified as "1." Otherwise it will be classified as "0." The hidden assumption is that if a cashier action was prevented after manager approval was prompted, then there is a strong likelihood that this action was a fraud attempt.

The trainer 160 provides the tagged transaction logs (with events/incidents tagged with 0 or 1) as expected outcomes from the interrupter 170. The trainer 160 also provides additional enterprise data as context for each transaction identified in the transaction log as features or parameters upon which the interrupter 170 uses to configure its underlying machine-learning algorithm/model. This other data (features/parameters) is based on incidents/events and include: 1) the event type (for example, adding an item to a transaction, department sale, transaction void, etc.); 2) event time; 3) transaction data at the time of the events (including number of items, total value, total return value, total voided value, transaction start time, scan intervals, and others); 3) transaction basket data at the time of the event—represented as the distribution of the basket of items between product catalogue departments (item identifiers assigned to product classifications and the distribution of the classifications over the product catalogue—the item identifiers themselves are not used as they are not quantitative values); and 4) cashier history (number of past justified and unjustified manager approval events/incidents for each cashier). The basket of items are clustered based on the product catalogue (merchandise hierarchy). So, the merchandise hierarchy and a clustering of the hierarchy for a given transaction as used as one of the features upon which the interrupter 170 is trained by the trainer 160.

In an embodiment, the enterprise data 110 includes historical transaction data for the enterprise that spans one to several years' worth of transaction data and transaction logs having the incidents/events that caused the transaction interruptions (requested management approvals and interrupted the corresponding transactions).

Initially, the trainer 160 is used to train the interrupter 170 against a configurable amount of transaction data, transaction logs, and cashier history data. The features discussed above for the incidents/events including with the corresponding basket data for each transaction (the items and their product catalogue classifications) are passed as parameters or factors to the interrupter 170. The tagged logs identify for the interrupter which transactions and events should have caused a transaction interruption (management approval) and which should not have caused a transaction interruption.

Through experimentation it was determined that there is a strong correlation between the basket of items and their corresponding product catalogue classifications and transaction events incidents that require transaction interruptions. Thus, the basket data is a reliable and strong factor in predicting needed transaction interruptions.

As used herein the terms "factors," parameters," and "features" may be used interchangeably and synonymously. These terms refer to the input data that is processed by the interrupter 170 to make a prediction as to whether a given transaction event within the context of a given transaction should require a transaction interruption. The input data is as described above as the parameters, the most significant of which is the basket data (items in a given transaction) along with each item's corresponding product catalogue classification for a given retailer.

The interrupter 170 is any regression-based algorithm that takes as input the features and the expected output (tagged transaction log data) during a training session with the trainer 180. The interrupter 170 derives an algorithm/model that weights each of the features and produces a numeric output on a scale of 0 to 1. 0 is an indication that there is not believed to be any risk of fraud or need for a transaction interruption with a given transaction, whereas as 1 is an indication that fraud and a transaction interruption is needed for the given transaction. Thus, the closer the numeric output of the interrupter 170 is to 1 for a given transaction, the more confidence that the interrupter 170 has that the transaction requires a transaction interruption for management approval in order for the transaction to complete an action for the transaction.

In an embodiment, 80% of the initial training data is used by the trainer 160 to train the interrupter 170, the remaining 20% of the training data is used to test the accuracy of the interrupter 160.

In an embodiment, the product catalogue is clustered to further reduce item classifications. Each item of a given transaction is assigned a product catalogue classification and a cluster identification. This can be used to further reduce the number of unique product catalogue classifications in the product hierarchy of a give retailer (this also allows for convergence and building of a feasible module).

Once fully trained, the interrupter 170 is released for production and integrated into the retailer's transaction processing. When transaction software generates events, the events, and transaction data including the cashier data is passed from the terminals 130 using the API 190 to the interrupter 170 as input. The interrupter 170 extracts the features from the real-time transaction data and applies the features to the algorithm/model produced after training with the trainer 160. This results in output as discussed above produced from the interrupter as to whether the transaction requires interruption or not.

In an embodiment, the output produced by the interrupter 170 is provided to the interrupt notifier 180, which then decides based on predefined threshold comparison as to whether to send a real-time message using the API 190 back to an agent on the terminal 130 to interrupt the transaction for management approval or whether to allow the transaction to continue with no interruption.

In an embodiment, the output produced by the interrupter 170 is passed from the notifier 180 through the event-based API 190 to the transaction terminal 130. An agent executing on the terminal 130 then determines based on the output whether a transaction interruption needs to be raised on the terminal or not.

So, the decision to interrupt or not interrupt the transaction can be made by the notifier 180 or made by an agent that processes on the terminals 130.

In an embodiment, the trainer 160, the interrupter 170, the notifier 180, and the API 190 all reside in a cloud processing environment. The retailer integrates its transaction processing by using an agent deployed in the transaction workflow on the terminals 130 to use the API 190 to communicate the real-time transaction data and events. The agent is then instructed to cause a transaction interruption by the notifier 180 through the API 190 or the agent independently decides whether to cause a transaction interruption based on the output produced by the interrupter 170 from the transaction data and transaction events as reported by the notifier 180 through the API 190.

In an embodiment, the API 190 acts as an even classifier that classifies transaction events before providing as input to the interrupter 170.

In an embodiment, the agent on the terminals 130 reports the results associated with each suggested transaction interruption back through the API 190 and when there was no management action needed, the trainer 160 records the transaction event and the transaction data for a subsequent re-training session of the interrupter 170. This allows the interrupter 170 to adapt and change over time becoming more accurate based on actual reported results.

In an embodiment, the interrupter 170 may be integrated into customer returns at customer service terminals 150.

In an embodiment, the interrupter 170 may be integrated into transactions where employees use mobile user-devices 140 to check out customers (such as by using mobile phones or tablet devices).

In an embodiment, the interrupter 170 may be integrated into transactions where employees use a retailer's online interface 120 to check customers out through a browser-based interface.

In an embodiment, modules 160-190 are provided as Software-as-a-Service (SaaS) to a given enterprise on a subscription basis.

In an embodiment, the transaction terminals 130 include: a Point-Of-Sale (POS) terminal, a Self-Service Terminal (SST) where a cashier is assisting a customer, and/or a kiosk where a cashier is assisting a customer.

In an embodiment, the user devices 140 include: a phone, a tablet, a laptop, and/or a wearable processing device.

In an embodiment, the customer service terminals 150 are desktops, tablets, phones, laptops, and/or transaction terminals 130 configured or being used for customer service operations at any given point in time.

In an embodiment, the transaction events and transaction data that precipitated transaction interruption decisions by the interrupter 170 and/or notifier 180 can be retained and correlated with cashiers for purposes of evaluated common behaviors of fraudster cashiers within a retailer.

In an embodiment, the system 100 services multiple different retailers and retailer environments and leverages knowledge gained from behaviors of retailers across the different retailers.

The system 100 provides a trained machine-learning interrupter 170 that is trained to evaluate terminal events and the corresponding transaction data to decide when a transaction requires interruption for management credentials or intervention and when a transaction does not require intervention. It is a dynamic system that is continually being trained and adapted. The system is accessible through API 190 to the retailer's platform and terminals 130. Because the system 100 does not rely on predefined business rules and predefined constant threshold values, the system 100 can adapt to fraud events detected for cashier/operators and change with changing behaviors of fraudsters.

With the system 100, the overall number of unjustified manger approval incidents will dramatically reduce, saving the retailer millions of dollars in work hours. At the same time, the overall number of justified manage approvals will increase, which enhances fraud deterrence. Manager approvals will no longer rely on constants coded in software rules or predictable thresholds. Classification of such incidents rely on many other transactional factors that were not considered until now with the teachings presented herein, such the system 100 is significantly more accurate, reliable, and smarter than any conventional approach available. Furthermore, fraudster cashiers will find it much harder to study and predict which incidents will trigger manager approval—it will be harder for them to commit fraud without being captured. Also, retailers will no longer need to devote time and effort in configuring thresholds for manager approvals in hardcoded business rules. The system 100 is adaptive, every new incident/event is added to the model developed by the interrupter 170 through continuous re-training, such that as sales and fraud patterns change, the system 100 automatically self-learns and adapts itself.

These and other embodiments are now discussed with reference to the FIGS. 2-4.

Figure 2:
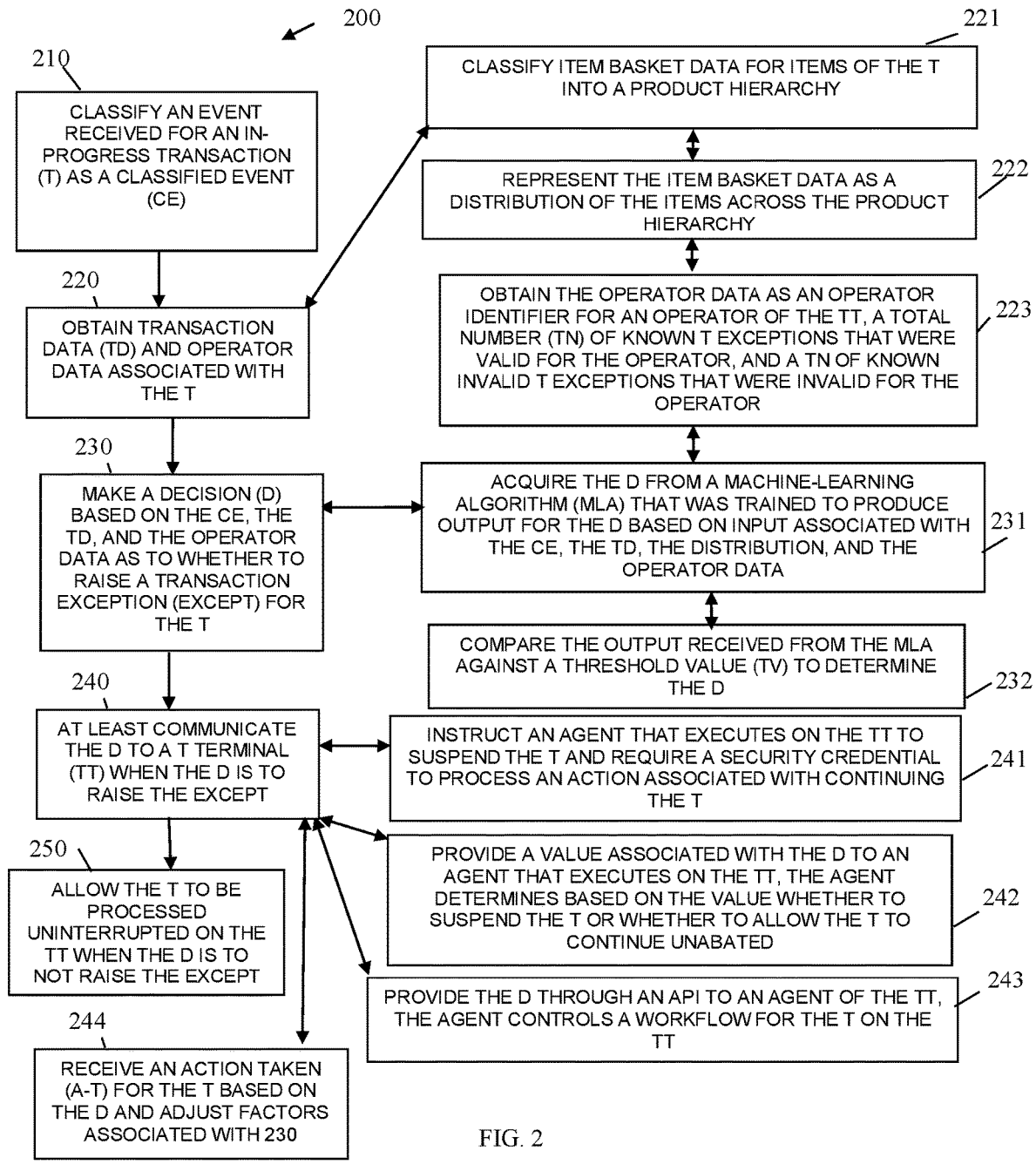
FIG. 2 is a diagram of a method for transaction exception and fraud processing, according to an example embodiment.

FIG. 2 is a diagram of a method 200 for transaction exception and fraud processing, according to an example embodiment. The software module(s) that implements the method 200 is referred to as a "transaction exception manager." The transaction exception manager is implemented as executable instructions programmed and residing within memory and/or a non-transitory computer-readable (processor-readable) storage medium and executed by one or more processors of a device. The processor(s) of the device that executes the transaction exception manager are specifically configured and programmed to process the transaction exception manager. The transaction exception manager has access to one or more network connections during its processing. The network connections can be wired, wireless, or a combination of wired and wireless.

In an embodiment, the device that executes the transaction exception manager is a server. In an embodiment, the server is a cloud processing environment that comprises multiple servers cooperating with one another as a single server. In an embodiment, the server is a Local Area Network (LAN) server.

In an embodiment, the device that executes the transaction exception manager is a network-edge device that is local or on an edge of a LAN of a retail store.

In an embodiment, the transaction exception manager is all of or some combination of: 160-190.

In an embodiment, the transaction exception manager is provided as a SaaS to a plurality of enterprises, each enterprise having a subscription relevant to its customers and its provided transaction and cashier data.

At 210, the transaction exception manager classifies an event received from an in-progress transaction as a classified event. The event types can be configured based on the retailer and can include, by way of example only, addition of items to a transaction, voiding items, voiding a transaction, overriding a price, a sale for a specific product or department, etc.

At 220, the transaction exception manager obtains transaction data and operator data associated with the transaction. This includes any of the above-numerated transaction data, transaction basket data, and cashier history data described with the FIG. 1.

In an embodiment, at 221, the transaction exception manager classifies item basket data for items of the transaction into a product hierarchy (merchandise hierarchy or classification scheme of the retailer).

In an embodiment of 221 and at 222, the transaction exception manager represents the item basket data as a distribution of the items in the transaction across the product hierarchy.

In an embodiment of 222 and at 223, the transaction exception manager obtains the operator data as: an operator (cashier) identifier for a cashier of the transaction terminal where the transaction is being processed, a total number of known transaction exceptions there were valid for the cashier, and a total number of known invalid transaction exceptions that were known to be invalid for the operator.

At 230, the transaction exception manager makes a decision based on the classified event, the transaction data, and the operator data as to whether to raise a transaction exception for the transaction that will interrupt the processing of the transaction on the transaction terminal.

In an embodiment of 223 and 231, at 232, the transaction exception manager acquires the decision from a machine-learning algorithm that was trained to produce output for the decision based on input associated with the classified vent, the transaction data, the distribution of basket items, and the operator data.

In an embodiment of 232 and at 233, the transaction exception manager compares the output received from the machine-learning algorithm against a threshold value to determine the decision. That is, the output may not be a binary value (0 or 1); rather, the output may be a range of values between 0 and 1, such that thresholds can be used to make the decision.

At 240, the transaction exception manager at least communicates the decision to the transaction terminal when the decision is to raise the exception and suspend processing of the transaction on the transaction terminal.

In an embodiment, at 241, the transaction exception manager instructs an agent that executes on the transaction terminal to suspend the transaction and require a security credential to process an action associated with continuing the transaction on the transaction terminal. For example, the security credential may be a passcode known only to a manager, such that entry of the security credential on the transaction terminal indicates manager approval for the action to be processed for the transaction.

In an embodiment, at 242, the transaction exception manager provides a value associated with the decision to an agent that executes on the transaction terminal. The agent determined based on the value whether to suspend the transaction or whether to allow the transaction to continue processing unabated on the transaction terminal.

In an embodiment, at 243, the transaction exception manager provides the decision through an API to an agent of the transaction terminal. The agent controls the workflow (process flow) for the transaction on the transaction terminal.

In an embodiment, at 244, the transaction exception manager receives an action that was processed or taken for the transaction based on the decision. The action is used to adjust factors associated with making the decision at 230. This allows for continual retaining of factors/features associated with making decisions for transaction exceptions.

In an embodiment, at 250, the transaction exception manager allows the transaction to be processed uninterrupted on the transaction terminal when the decision is to not raise the exception.

Figure 3:
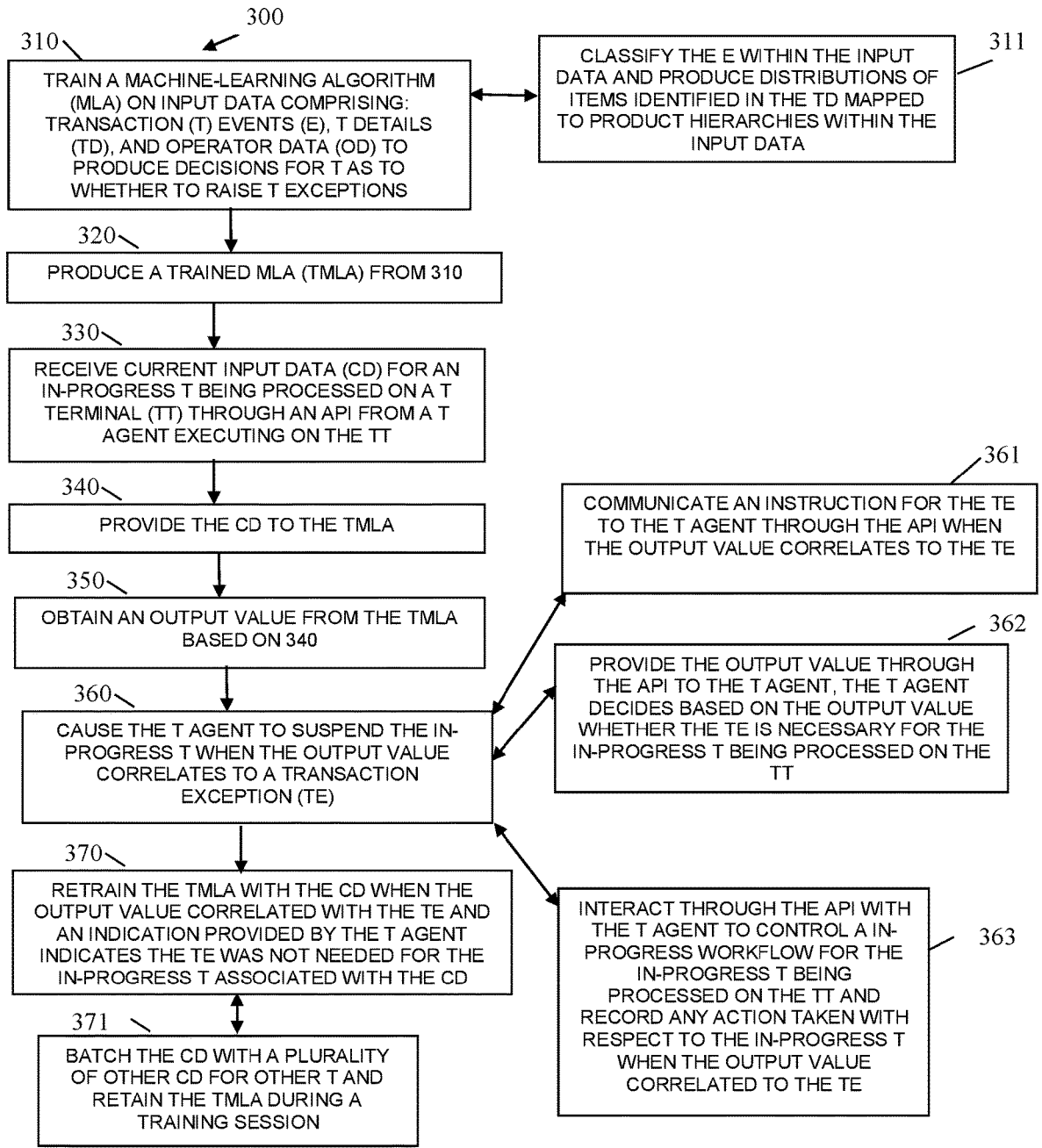
FIG. 3 is a diagram of another method for transaction exception and fraud processing, according to an example embodiment.

FIG. 3 is a diagram of another method 300 for transaction exception and fraud processing, according to an example embodiment. The software module(s) that implements the method 300 is referred to as a "transaction fraud detector." The transaction fraud detector is implemented as executable instructions programmed and residing within memory and/or a non-transitory computer-readable (processor-readable) storage medium and executed by one or more processors of a device. The processors that execute the transaction fraud detector are specifically configured and programmed to process the transaction fraud detector. The transaction fraud detector has access to one or more network connections during its processing. The network connections can be wired, wireless, or a combination of wired and wireless.

In an embodiment, the device that executes the transaction fraud detector is a server. In an embodiment, the server is a cloud processing environment that comprises multiple servers cooperating with one another as a single server. In an embodiment, the server is a LAN server that is local to a retail store.

In an embodiment, the device that executes the transaction fraud detector is a network-edge device that is on the edge of a LAN for a retail store.

In an embodiment, the transaction fraud detector is all or some combination of: 160, 170, 180, 190, and/or the method 200.

The transaction fraud detector presents another and, in some ways, enhanced processing perspective to that which was described above with the FIG. 2.

At 310, the transaction fraud detector trains a machine-learning algorithm on input data that comprises: transaction events, transaction details, and operator data for purposes of producing decisions as to whether transaction exceptions are to be raised for transactions.

In an embodiment, at 311, the transaction fraud detector classifies the events within the input data and produces distributions of items identified in the transaction details mapped to product hierarchies within the input data.

At 320, the transaction fraud detector produces a trained machine-learning algorithm from the processing at 310.

At 330, the transaction fraud detector receives current input data from an in-progress transaction being processed on a transaction terminal through an API from a transaction agent that executes on the transaction terminal.

At 340, the transaction fraud detector provides the current input data to the trained machine-learning algorithm.

At 350, the transaction fraud detector obtains an output value from the trained machine-learning algorithm based on 340 (providing the current input data).

At 360, the transaction fraud detector causes the transaction agent to suspend the in-progress transaction when the output value correlates to a transaction exception.

In an embodiment, at 361, the transaction fraud detector communicates an instruction for the transaction exception to the transaction agent through the API when the output value correlates to the transaction exception.

In an embodiment, at 362, the transaction fraud detector provides the output value through the API to the transaction agent. The transaction agent decides based on the output value whether the transaction exception is necessary for the in-progress transaction that is being processed on the transaction terminal or whether no transaction exception is needed at all for the in-progress transaction.

In an embodiment, at 363, the transaction fraud detector interacts through the API with the transaction agent to control an in-progress workflow for the in-progress transaction being processed on the transaction terminal, and the transaction fraud detector records any action with respect to the in-progress transaction when the output value correlated to the transaction exception.

In an embodiment, at 370, the transaction fraud detector retrains the trained machine-learning algorithm with the current input data when the output value correlated with the transaction exception and an indication provided by the transaction agent indicates the transaction exception was not needed for the in-progress transaction associated with the current input data.

In an embodiment of 370 and at 371, the transaction fraud detector batches the current input data with a plurality of other current input data for other transactions and retrains the trained machine-learning algorithm during a training session.

Figure 4:
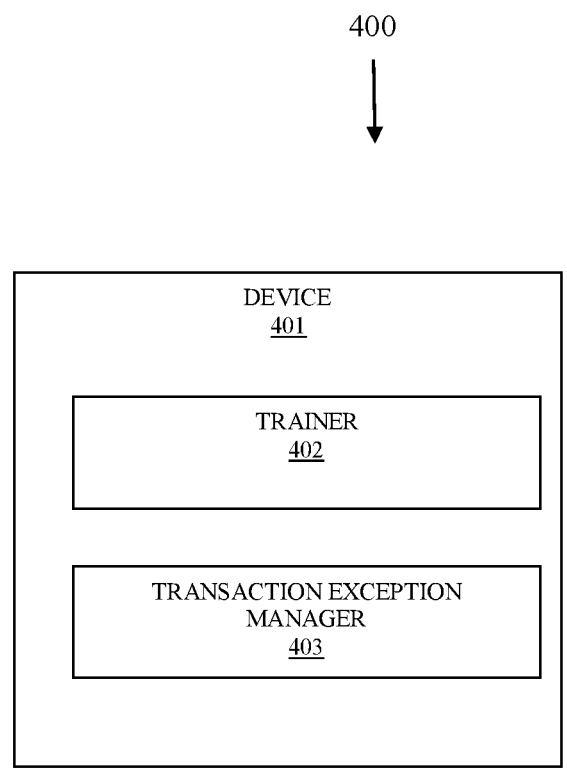
FIG. 4 is a diagram of another system for transaction exception and fraud processing, according to an example embodiment.

FIG. 4 is a diagram of a system 400 for transaction exception and fraud processing, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a processing device 401, a trainer 402, and a transaction exception manager 403.

In an embodiment, the processing device 401 is a server. In an embodiment, the server is a collection of servers that cooperate as a cloud processing environment.

In an embodiment, the processing device 401 is a network edge device.

The trainer 402 is a set of executable instructions that is executed on one or more hardware processors of the processing device 401 from a non-transitory computer-readable storage medium or memory.

The transaction exception manager 403 is also a set of executable instructions that is executed on one more hardware processors of the processing device 401 from a non-transitory computer-readable storage medium or memory.

The trainer 402, when executed by the processor(s) of the device 401, is configured to cause the processor to: 1) obtain transaction events from transaction logs; 2) obtain transaction data for transactions associated with the transaction events; 3) obtain operator data for operators that performed the transactions; 4) classify the events into classified events; 5) produce basket data distributions for items of the transactions across product hierarchies; 6) tag the transaction logs with values indicating whether the transaction events required transaction exceptions or did not require transaction exceptions; 7) produce input training data comprising: classified events, tagged transaction logs, the basket data distributions, the transaction data, and the operator data; and 8) train the transaction exception manager 403 with the input training data.

The trainer 402 trains the transaction exception manager 403 to detect events during a transaction that require transaction interruption for manager approval.

The transaction exception manager 403 derives a machine-learning algorithm that derives an algorithm/model based on the input training data.

In an embodiment, the trainer 402 is the trainer 160.

The transaction exception manager 403, when executed by the processor(s) of the device 401, is configured to cause the processor to: 1) derive a machine-learning algorithm/model from the training of the trainer 402; 2) receive real-time input data from a transaction agent during an in-progress transaction being processed on a transaction terminal; 3) produce a decision as to whether the in-process transaction is to be interrupted with a transaction exception using the machine-learning algorithm; and 4) communicate the decision to the transaction agent.

In an embodiment, the transaction exception manager 403, when executed by the processor(s) of the device 401, is further configured to cause the processor to: interact from a cloud processing environment with the transaction agent during processing of the in-progress transaction on the transaction terminal utilizing an API.

In an embodiment, the device 401 is a cloud-based device that provides a user-facing interface to a user over a network to configure the trainer 402 and the transaction exception manager 403 for the given product catalogue at a given retail store and given transaction events of the retail store.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
providing executable instructions from a non-transitory computer-readable medium to a hardware processor of a server causing the hardware processor to perform operations comprising:
training a machine learning module (MLM) by providing as input to the MLM previous classified events classified for previous transaction events, previous transaction data, previous terminal operator data, other previous data, and receiving as output from the MLM operator decisions indicating whether to or whether not to raise transaction exceptions for previous transactions based on actual previously observed transaction exceptions for the previous transactions, wherein each decision is a numeric value on a scale of 0 to 1 with 1 being an indication of fraud associated with the corresponding previous transaction;
establishing a training loop for retraining the MLM when a given decision indicates the transaction exception was not needed for an in-progress transaction;
deploying a second set of executable instructions to a transaction workflow of a transaction terminal, wherein the second set of executable instructions executes as an agent and interacts with the method during the transaction workflow for a current transaction being processed on the transaction terminal using the agent;
raising, by the agent, an event during the in-progress transaction;
receiving the event as an indication from the agent that an item was added to the in-progress transaction, an item return was initiated, a transaction void was initiated, or a sale price was offered on a given item of the in-progress transaction;
classifying the event received for the in-progress transaction as a classified event based on whether the event indicated that the item was added to the in-progress transaction, the item returned was initiated, the transaction void was initiated, or the sale price was offered on the given item of the in-progress transaction;
obtaining transaction data and operator data for an operator who is operating the transaction terminal during the in-progress transaction and obtaining other data associated with other transactions at the transaction terminal;
dynamically determining based on the classified event, the transaction data, the operator data, the other data, and the other operator data as to whether to raise a current transaction exception for the in-progress transaction by providing the transaction data, the operator data, the other data, and the other operator data as input to the MLM and receiving as output from the MLM a current decision indicating whether to or whether not to raise the transaction exception;
at least communicating the decision to the transaction terminal that is processing the in-progress transaction when the numeric value for the current decision is above a threshold to raise the transaction exception causing operation of the transaction terminal to be held in abeyance for an override before the in-progress transaction is permitted to continue processing on the transaction terminal; and
replacing existing hardcoded business rules and replacing predefined constant threshold values processed by the transaction terminal for transaction interruptions that require management approvals at the transaction terminal by processing the method in place of the existing hardcoded business rules and predefined constant threshold values processed by the transaction terminal.

2. The method of claim 1 further comprising, allowing the in-progress transaction to be processed uninterrupted on the transaction terminal when the dynamically determining results in the decision to not raise the transaction exception.

3. The method of claim 1, wherein obtaining further includes classifying item basket data for items of the in-progress transaction into a product hierarchy.

4. The method of claim 3, wherein classifying the item basket data further includes representing the item basket data as a distribution of the items across the product hierarchy.

5. The method of claim 4, wherein representing further includes obtaining the operator data as an operator identifier for the operator of the transaction terminal, and a total number of known transaction exceptions that were valid for the operator and a total number of known invalid transaction exceptions that were invalid for the operator.

6. The method of claim 1, wherein at least communicating further includes instructing the agent that executes on the transaction terminal to suspend the in-progress transaction and require a security credential to process an action associated with continuing the in-progress transaction.

7. The method of claim 1, wherein at least communicating further includes providing a value associated with a decision for raising or not raising the transaction exception to the agent executing on the transaction terminal, wherein the agent determines based on the value whether to suspend the in-progress transaction or whether to allow the in-progress transaction to continue unabated.

8. The method of claim 1, wherein at least communicating further includes providing a decision for raising or not raising the transaction exception through an Application Programming Interface (API) to the agent of the transaction terminal, wherein the agent controls the transaction workflow for the in-progress transaction on the transaction terminal.

9. The method of claim 1, wherein at least communicating further includes receiving an action taken for the in-progress transaction based on the decision and adjusting factors associated with the dynamically determining based on the action taken.

10. A method, comprising:
providing executable instructions from a non-transitory computer-readable medium to a hardware processor of a server causing the hardware processor to perform operations comprising:
training a machine learning model (MLM) on input data comprising:
classified transaction events associated with previous transaction events, previous transaction details, and previous operator data and expected output data as decisions as to whether previous transactions were or were not associated with fraud for previous transactions for purposes of raising transaction exceptions, wherein each decision is a numeric value on a scale of 0 to 1 with 1 being an indication of fraud associated with the corresponding previous transaction;
producing a trained machine-learning algorithm from the training;
establishing a training loop for retraining the MLM when a given decision indicates the transaction exception was not needed for an in-progress transaction;
deploying a second set of executable instructions to a transaction workflow of a transaction terminal, wherein the second set of executable instructions executes as a transaction agent and interacts with the method during the transaction workflow for a transaction being processed on the transaction terminal using the transaction agent;
raising, by the transaction agent, a current transaction event from the transaction terminal;
detecting the current transaction event as an indication that an item was added to the in-progress transaction, an item return was initiated, a transaction void was initiated, or a sale price was offered on a given item of the in-progress transaction;
obtaining current input data including a current classified transaction event based on the detecting for the in-progress transaction being processed at the transaction terminal through an Application Programming Interface (API) from the transaction agent executing during the transaction workflow being processed on the transaction terminal for the in-progress transaction;
providing the current input data to the trained machine-learning algorithm;
receiving an output value as a current automated decision from the trained machine-learning algorithm based on the providing;
dynamically causing the transaction agent to suspend processing of the in-progress transaction on the transaction terminal when a value for the current automated decision is at or above a threshold for the corresponding numeric value indicating a correlation to a transaction exception until an override is received that permits the in-progress transaction to continue processing on the transaction terminal; and
replacing existing hardcoded business rules and replacing predefined constant threshold values processed by the transaction terminal for transaction interruptions that require operators to obtain management approvals at the transaction terminal by processing the method, wherein the operators operate the transaction terminal other transaction terminals and wherein the operator data comprises operator metrics for the operators based on other transactions processed by the operators on the transaction terminal.

11. The method of claim 10 further comprising, retraining the trained machine-learning algorithm with the current input data when the output value correlated to the transaction exception and an indication provided from the transaction agent indicates the transaction exception was not needed for the in-progress transaction associated with the current input data.

12. The method of claim 11, wherein retaining further includes batching the current input data with a plurality of other current input data for the other transactions and retraining the trained machine-learning algorithm during a training session.

13. The method of claim 10, wherein training further includes classifying the transaction events within the input data and producing distributions of items identified in the transaction details mapped to product hierarchies within the input data.

14. The method of claim 10, wherein causing further includes communicating an instruction for the transaction exception to the transaction agent through the API when the output value correlates to the transaction exception.

15. The method of claim 10, wherein causing further includes providing the output value through the API to the transaction agent, wherein the transaction agent decides based on the output value whether the transaction exception is necessary for the in-progress transaction being processed on the transaction terminal.

16. The method of claim 10, wherein causing further includes interacting through the API with the transaction agent to control the transaction workflow for the in-progress transaction being processed on the transaction terminal and recording any action taken with respect to the in-progress transaction when the output value correlated to the transaction exception.

17. A system, comprising:
a processing device comprising at least one processor and a non-transitory computer-readable storage medium;
the non-transitory computer-readable storage medium comprising executable instructions for a trainer and a transaction exception manager;
the executable instructions for the trainer provided to the at least one processor from the non-transitory computer-readable storage medium causing the at least one processor to perform first operations comprising:
obtaining transaction events from transaction logs;
obtaining transaction data for transactions associated with the transaction events;
obtaining operator data for operators that performed the transactions;
classifying the events into classified events;
producing basket data distributions for items of the transactions across product hierarchies;
tagging the transaction logs with values indicating whether the transaction events required transaction exceptions or did not require the transaction exceptions;
producing input training data comprising classified events, tagged transaction logs, the basket data distributions, the transaction data, and the operator data;

training the transaction exception manager as a machine learning model (MLM) with the input training data and with the expected output, wherein each expected output is a transaction exception decision indicating whether the corresponding transaction required a specific transaction exception or did not require the specific transaction exception, wherein each transaction exception decision is a numeric value on a scale of 0 to 1 with 1 being an indication of fraud associated with the corresponding transaction; and establishing a training loop for retraining the transaction exception manager when a given decision indicates the transaction exception was not needed for an in-progress transaction; and the executable instructions for the transaction exception manager provided to the at least one processor from the non-transitory computer-readable storage medium causing the at least one processor to perform second operations comprising:

deploying a second set of executable instructions to a transaction workflow of a transaction terminal, wherein the second set of executable instructions executes as an agent and interacts with the method during the transaction workflow for a transaction being processed on the transaction terminal, and processing the agent;

raising, by the agent, a current transaction event of the transaction workflow;

detecting the current transaction event during the in-progress transaction at the transaction terminal as an indication that an item was added to the in-progress transaction, an item return was initiated, a transaction void was initiated, or a sale price was offered on a given item of the in-progress transaction;

classifying, by the agent, the current transaction event as a current classified event based on detecting the current transaction event;

obtaining real-time input data from the transaction agent during the in-progress transaction being processed on the transaction terminal;

dynamically producing an automated decision as to whether the in-process transaction is to be interrupted with a current transaction exception using the transaction exception manager by providing the real-time input data and the current classified event as input to the transaction exception manager and receiving as output the automated decision as a specific indication as to whether the in-progress transaction should or should not be suspended or interrupted, wherein when the corresponding numeric value for the automated decision exceeds a threshold the current transaction exception is raised;

communicating the automated decision to the transaction agent;

replacing existing hardcoded business rules and predefined threshold values processed by the transaction terminal for transaction interruptions that require operators to obtain management approvals at the transaction terminal by processing the executable instructions for the transaction exception manager;

wherein when the automated decision is to interrupt the transaction, the automated decision causing the transaction agent to hold operation of the transaction terminal in abeyance for an override before the in-progress transaction is permitted to continue processing on the transaction terminal.

18. The system of claim 17, wherein the transaction exception manager is further configured when executed from the at least one processor to cause the processor to: interact from a cloud processing environment with the transaction agent during processing of the in-progress transaction on the transaction terminal utilizing an API.

* * * * *